US012787147B2

(12) United States Patent
Funk

(10) Patent No.: US 12,787,147 B2
(45) Date of Patent: Nov. 3, 2026

(54) HIGH-VACUUM BELLOWS RADIO FREQUENCY (RF) SHIELD CORRECTOR SYSTEM AND ASSOCIATED METHODS

(71) Applicant: Fermi Research Alliance, LLC, Batavia, IL (US)

(72) Inventor: Tyler Funk, Batavia, IL (US)

(73) Assignee: Fermi Forward Discovery Group, LLC, Chicago, IL (US)

(*) Notice: Subject to any disclaimer, the term of this patent is extended or adjusted under 35 U.S.C. 154(b) by 338 days.

(21) Appl. No.: 18/664,260

(22) Filed: May 14, 2024

(65) Prior Publication Data

US 2025/0358925 A1 Nov. 20, 2025

(51) Int. Cl.
*H05H 7/14* (2006.01)
*G21F 9/00* (2006.01)

(52) U.S. Cl.
CPC ............... *H05H 7/14* (2013.01); *G21F 9/001* (2013.01)

(58) Field of Classification Search
CPC .................................. H05H 7/14; G21F 9/001
See application file for complete search history.

(56) References Cited

U.S. PATENT DOCUMENTS 3,723,785 A * 3/1973 Nixon ........................ H01J 5/18 313/62
10,485,088 B1 * 11/2019 Hassan .................... H05H 7/20
10,645,793 B2 * 5/2020 Hassan .................... H05H 7/20
2015/0163895 A1 * 6/2015 Biallas .................... H05H 7/22 285/18

* cited by examiner

*Primary Examiner* — Sean Luck
(74) *Attorney, Agent, or Firm* — William A. Harding; Grable Martin PLLC

(57) ABSTRACT

A method comprising: 1) positioning an inflatable pipe plug inside a high-vacuum beam line assembly proximate an axial gap between two beam tubes mechanically connected by a bellows-encased radio frequency (RF) shield; 2) inflating a balloon of the pipe plug proximate the axial gap to exert a uniform pressure along dislocated fingers of the RF shield; 3) angularly bending the bellows to enlarge a repair portion of the axial gap to a width larger than the dislocated finger(s); and 4) returning the dislocated finger(s) to the operation-ready RF shield position under the uniform pressure before 5) deflating and removing the inflatable pipe plug. A corrector system kit may comprise a set of custom-sized balloon(s) of a nitrile material type, a fixed-length or tailorable delivery hose, and a connector(s). A fluid (e.g., gas, liquid) pump delivers pressured fluid to the selected/tailored connector, through the delivery hose, and into the balloon.

20 Claims, 12 Drawing Sheets

PRIOR ART

PRIOR ART

PRIOR ART

PRIOR ART

PRIOR ART

HIGH-VACUUM BELLOWS RADIO FREQUENCY (RF) SHIELD CORRECTOR SYSTEM AND ASSOCIATED METHODS

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to high-vacuum beam line assembly maintenance and, more particularly, to systems, devices and methods for repairing high-vacuum beam line assemblies while minimizing both radiation exposure to maintenance personnel and contamination spread on beam tube surfaces.

BACKGROUND OF THE INVENTION

As a matter of definition, a "particle accelerator" is a machine configured to use electric or electromagnetic fields to propel subatomic charged particles (e.g., protons, electrons) to high velocities and energies, and to shape the particles into well-defined beams. Common in particle accelerator design is employment of high-vacuum beam lines that may be formed from beam tube segments flexibly coupled by bellows designed to compensate for misalignment of these abutted beam tube components caused, for example, by shifts during high vacuum loads and/or by accumulation of error during fabrication and/or installation. In known embodiments of high-vacuum beam lines, bellows may be mechanically attached to abutted beam tubes to form the desired beam line structure.

Radio frequency (RF) shields are commonly deployed within particle accelerator bellows to shield the thin walls of the bellows' expansion joints from the beam and to provide geometric continuity to allow RF waves to pass through the axial gap between abutted beam tubes without a loss of signal. In a known RF shield design, a finger gasket may be welded to inside rims at both ends of the bellows. The finger gasket may be characterized by RF shield fingers implemented as thin metal "blades," each of which is fixed (e.g., welded) on one end proximate an outer surface of a received first beam tube, and is moveably held in place on an opposite end (e.g., kept in forced-based contact by an extension spring) proximate an outer surface of a received second beam tube.

During routine use of a high-vacuum beam line assembly so constructed, a combination of the spring's force against the RF shield fingers and of excessive flexing of the bellows can cause some number of the RF shield's fingers to pop out of position. Resetting these radially dislocated fingers can be difficult. For example, the typically small size of employed beam tubes and jointing bellows may limit the types of tools that can access the repair area to reset the RF shield fingers. In current practice, if a small number of RF shield fingers is dislocated, it may be possible for the bellows to remain intact (e.g., attached to the received beam tube(s)) while dislocated fingers are manipulated back into proper position either by hand or using a small tool. If, however, a large number of fingers are dislocated as a result of a failure event, current practice requires the bellows be cut out of the high-vacuum beam line assembly to reset the fingers with some sort of a tool, such as a screwdriver. If damage related to the dislocated fingers is too extensive to repair, the bellows assembly may be cut out of the beam line and replaced entirely.

In summary, typical methods for resetting RF shield fingers in beam line assemblies comprise the following steps:

1) Open up at least one of the pair of beam tubes to access the interior of the bellows assembly;
2) Reset each displaced RF shield finger in the bellows assembly using either some sort of tool (such as a screwdriver) or by hand, if necessary;
3) If unable to reset the RF shield fingers with the beam tube opened, cut the bellows assembly out of the beam line and reset the RF shield fingers before returning the repaired bellows assembly to use in the beam line; and
4) If the bellows assembly has been cut out of the beam line and the RF shield fingers still cannot be reset, replace the removed bellows assembly and/or RF shield with new ones.

Disadvantages of such known methods for resetting the fingers within an RF shield include the following:

A) The small diameter size of some bellows limits the types of tools that can be used to reset RF shield fingers;
B) Resetting RF shield fingers by hand with the bellows assembly intact can expose maintenance personnel to radiation contaminated environments;
C) Although using a tool to reset the RF shield fingers can reduce the risk of radiation exposure to maintenance personnel, contamination during the repair process may require cleaning and/or disposal of the tool itself in keeping with radiation exposure mitigation procedures; and
D) Removal and replacement of bellows assemblies and/or RF shields can be time consuming and cost prohibitive.

Accordingly, a need exists for a solution to at least one of the aforementioned challenges in high-vacuum beam line maintenance. An established need exists for safe, effective, and affordable systems, devices and/or methods for repairing displaced RF shield fingers in a high-vacuum beam line assembly.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to corrector systems, devices, and associated methods for repairing displaced RF shield fingers in a high-vacuum beam line assembly.

In certain embodiments of the present invention, a method of repairing a high-vacuum beam line assembly comprises the steps of: 1) positioning a balloon of an inflatable pipe plug inside the high-vacuum beam line assembly proximate an axial gap between abutted ends of two beam tubes aligned along a nominal axis and mechanically connected (in an operation-ready position) by a radio frequency (RF) shield comprising at least one spring configured to exert radially inward force on a plurality of fingers distributed azimuthally along a respective outer surface of each of the two beam tubes and configured to span the axial gap; 2) inflating the balloon proximate the axial gap to exert a substantially uniform pressure (e.g., approximately 10 pounds per square inch (psi)) radially outward from the nominal axis along the plurality of fingers and, particularly, upon some number of dislocated fingers of the plurality of fingers projecting radially inward of an inner surface of at least one of the two beam tubes (defining a repair portion of the axial gap); 3) manipulating a bellows configured to flexibly couple the beam tubes by angularly bending (e.g., at an approximate 15 degree angle from the nominal axis) some subset of cylindrically-formed expansion joints of the bellows to enlarge the repair portion of the axial gap to a width larger than a respective length of each of the dislocated finger(s); 4) upon the substantially uniform pressure from the balloon positioning the dislocated finger(s) with the plurality of fingers collectively in the operation-ready position, angularly bending the bellows along the subset of expansion joints to position the two beam tubes back in substantially axial alignment along the nominal axis; and/or 5) deflating the balloon to reduce axially outward pressure along the plurality of fingers proximate the axial gap before removing the inflatable pipe plug from inside the high-vacuum beam line assembly.

In certain embodiments of the present invention, the inflatable pipe plug may comprise a balloon of a nitrile material type, and a delivery hose configured in fluid communication with the balloon on a first end of the delivery hose and a connector on a second end of the delivery hose. The delivery hose may be sized (either fixed-length or tailorable) to extend from the balloon axially along an inside of one of the pair of beam tubes (i.e., a working beam tube) to position the connector proximate an access point in the working beam tube. Inflating the balloon may comprise pumping fluid (e.g., using an air compressor, manual hand pump, or other fluid delivery device configured in fluid communication with the connector) through the delivery hose and into the balloon.

In an alternative embodiment of the present invention, a corrector system kit for repairing a high-vacuum beam line assembly may comprise a plurality of ballons each as generally described hereinabove, at least one of which may be custom-sized for positioning inside the high-vacuum beam line assembly proximate the axial gap. The delivery hose may be configured to removably attach in fluid communication with each of the plurality of ballons on a first end and the connector (e.g., one of a plurality of adapters) on a second end. The delivery hose may be of tailorable (e.g., trimmable) length defined substantially from the access point to the axial gap. The corrector system kit may further comprise a decontaminating cleaning agent for cleaning the balloon(s) after use and/or a radioactive waste disposal bag sized to receive the inflatable pipe plug and associated corrector system components.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Certain embodiments of the systems, devices and methods for repairing a high-vacuum beam line assembly are now described in detail. Throughout this disclosure, the present invention may be referred to as a high-vacuum beam line assembly repair method, a high-vacuum bellows radio frequency (RF) shield corrector system, an RF shield corrector system, an RF shield corrector method, an RF shield fingers repair system, a method of positioning dislocated RF shield fingers, a corrector system, a corrector device, and/or a corrector method. Those skilled in the art will appreciate that this terminology is only illustrative and does not affect the scope of the invention. For instance, the present invention may just as easily relate to minimally invasive means of repositioning internal components radially outward within a process piping system.

Figure 1:
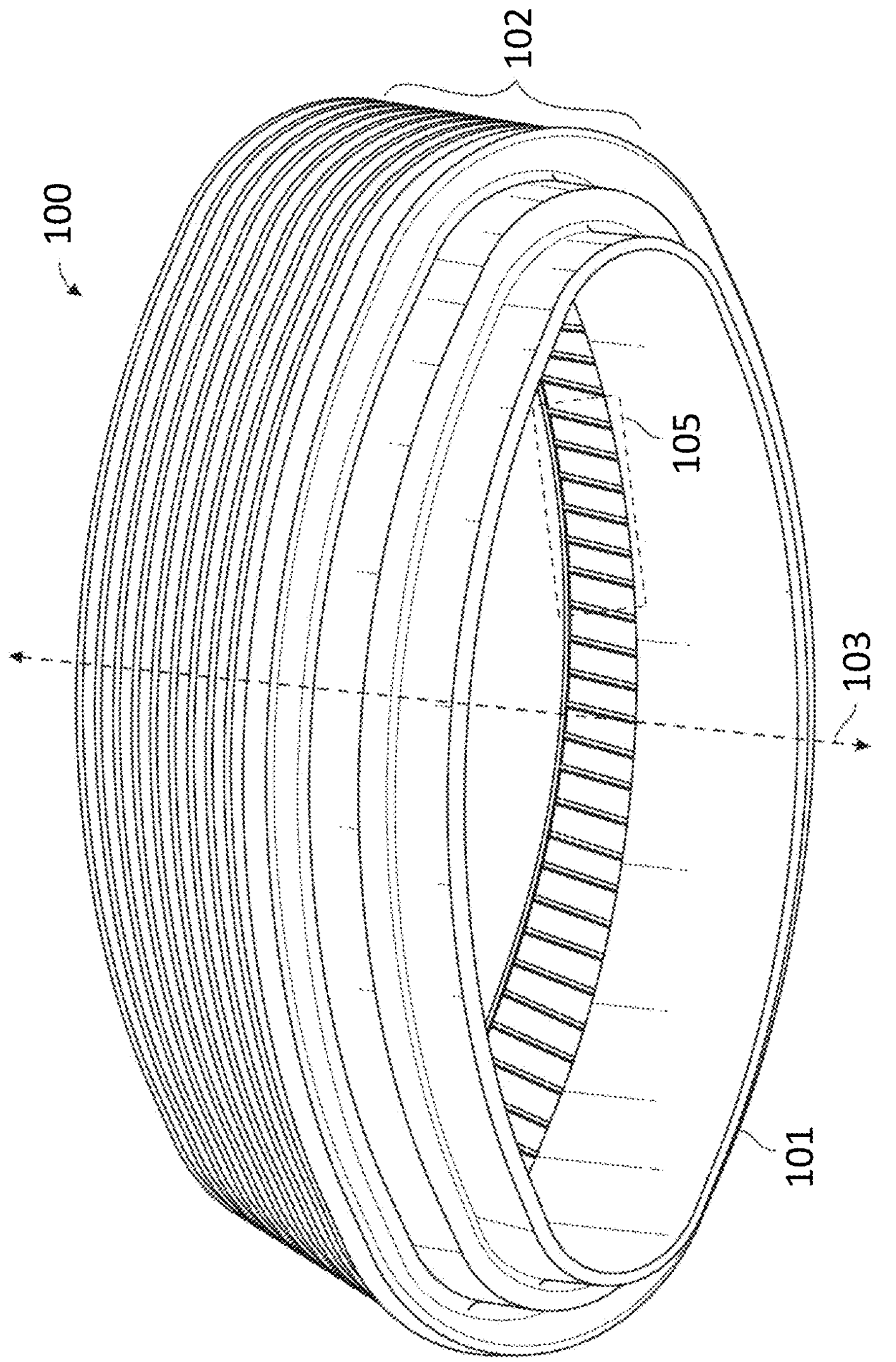
FIG. 1 is a top perspective view of a bellows assembly as known in the prior art.
Figure 2:
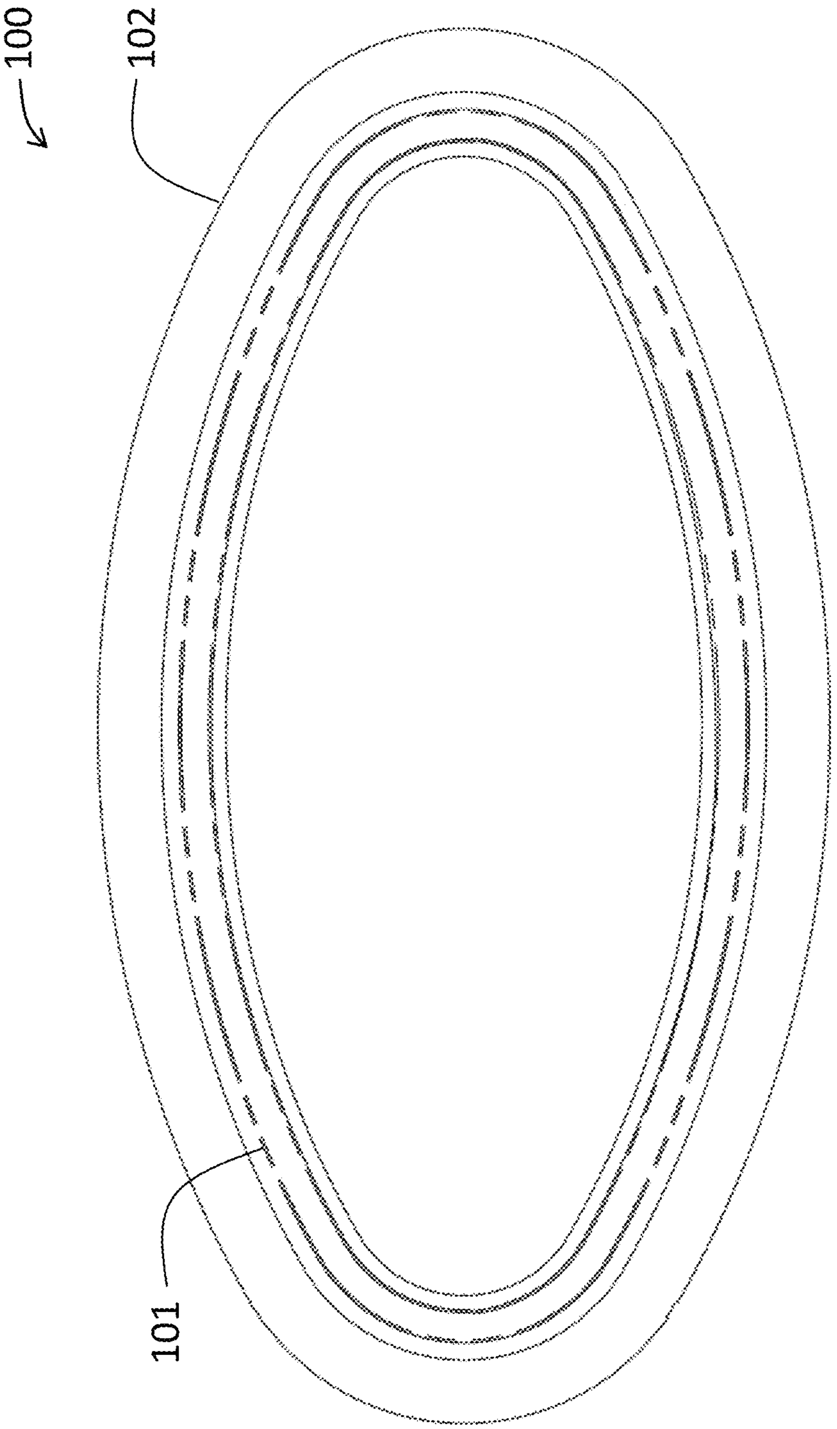
FIG. 2 is an end view of the bellows assembly of FIG. 1.

In general, various embodiments of the present invention may employ systems, devices, and/or methods of correcting the positions of dislocated RF shield fingers inside a high-vacuum beam line. For example, and without limitation, FIGS. 1 and 2 illustrate a bellows assembly 100 as generally described above and known in the prior art. This exemplary elliptically-shaped bellows assembly 100 may be characterized by cylindrically-formed bellows 102 between two mating ends 101 configured to receive one each of a pair of beam tubes. A person of skill in the art will immediately recognize that the present invention, as described hereinbelow, may be advantageously applied to repair of cylindrical bellows assemblies of shapes other than elliptical (as shown in FIGS. 1 and 2) and elliptical variants; for example, and without limitation, embodiments of the present invention may be advantageously applied to substantially spherical or ovoidal bellows assemblies.

Continuing to refer to FIGS. 1 and 2, an RF shield may be positioned radially inside the bellows 102 and mechanically attached between the mating ends 101 to create an axially flexible attachment between a received pair of beam tubes. The RF shield may present a tightly spaced grouping of fingers (as shown, in an operation-ready position 105) configured to span a gap between abutted ends of the received beam tubes. Such a bellows assembly 100 design may prevent misalignment of beam line components and shield typically thin bellows 102 wall components from the hosted beam, thereby providing geometric continuity to prevent loss of the RF signal.

Figure 3:
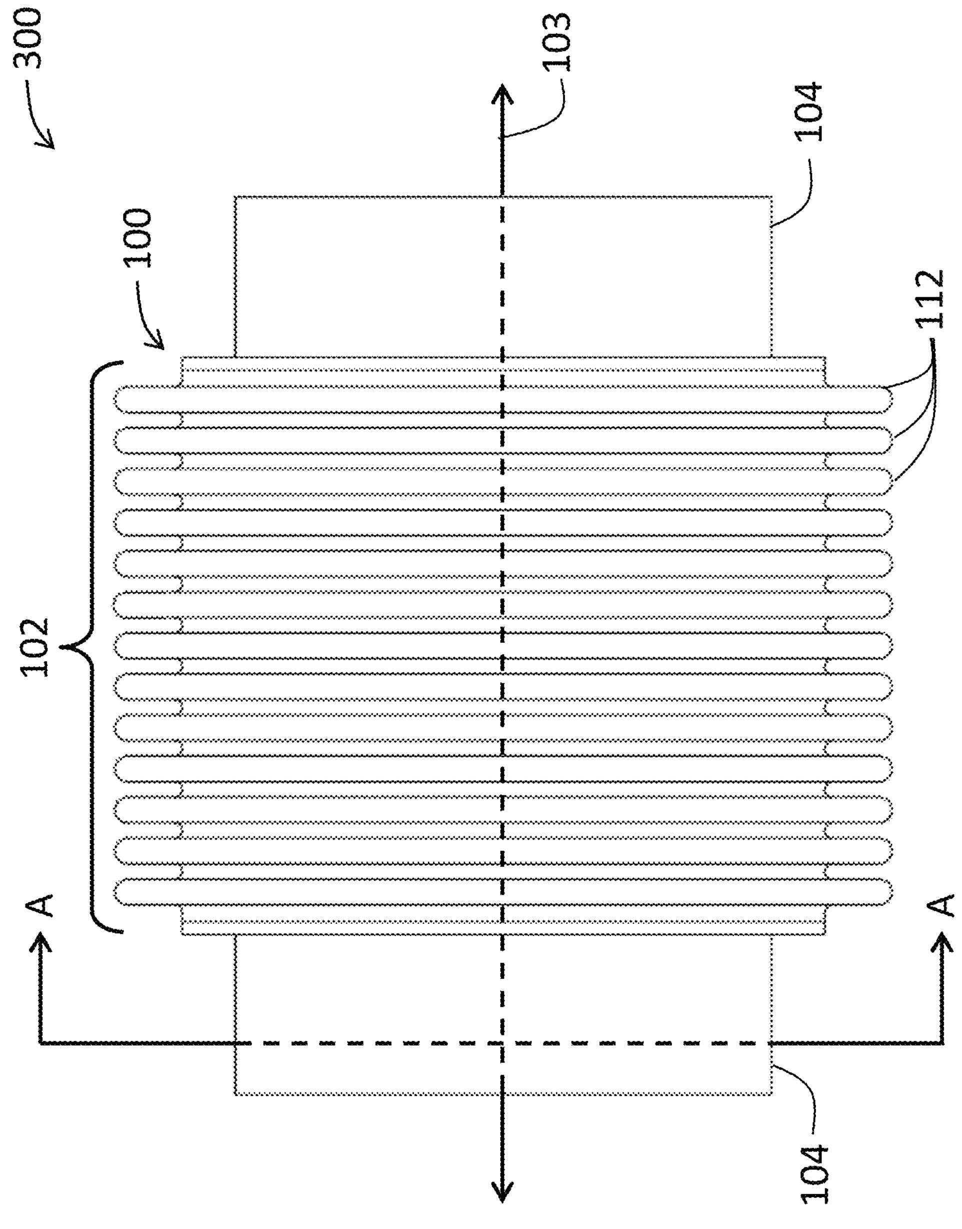
FIG. 3 is a side view of a high-vacuum beam line assembly as known in the prior art.

Referring additionally to FIG. 3, and still referring to FIGS. 1 and 2, an exemplary beam line assembly 300, as described above and known in the art, may comprise two abutted beam tubes 104 aligned by the receiving bellows assembly 100 to form a nominal axis 103 shared by the abutted beam tubes 104 and the bellows assembly 100. The bellows 102 may comprise expansion joints 112 configured to allow the bellows assembly 100 to compensate for any misalignment that may occur in a beam line under high-vacuum loads (e.g., any divergence of either or both the beam tubes 104 from the shared nominal axis 103). In such a configuration, the bellows 102 may reduce the stress on different components of the beam line assembly 300 while under vacuum.

Figure 4:
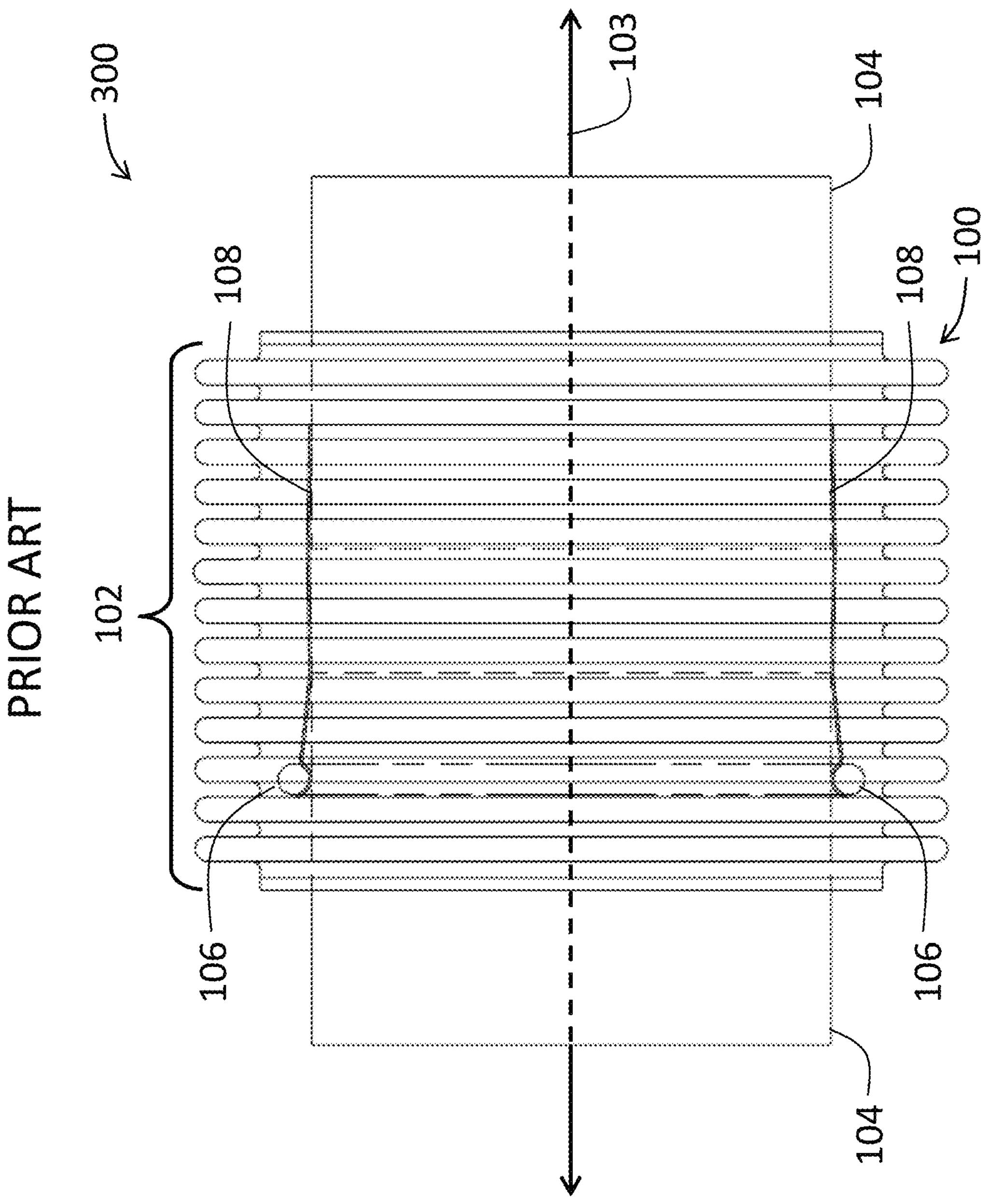
FIG. 4 is a transparent side view of the high-vacuum beam line assembly of FIG. 3.
Figure 5:
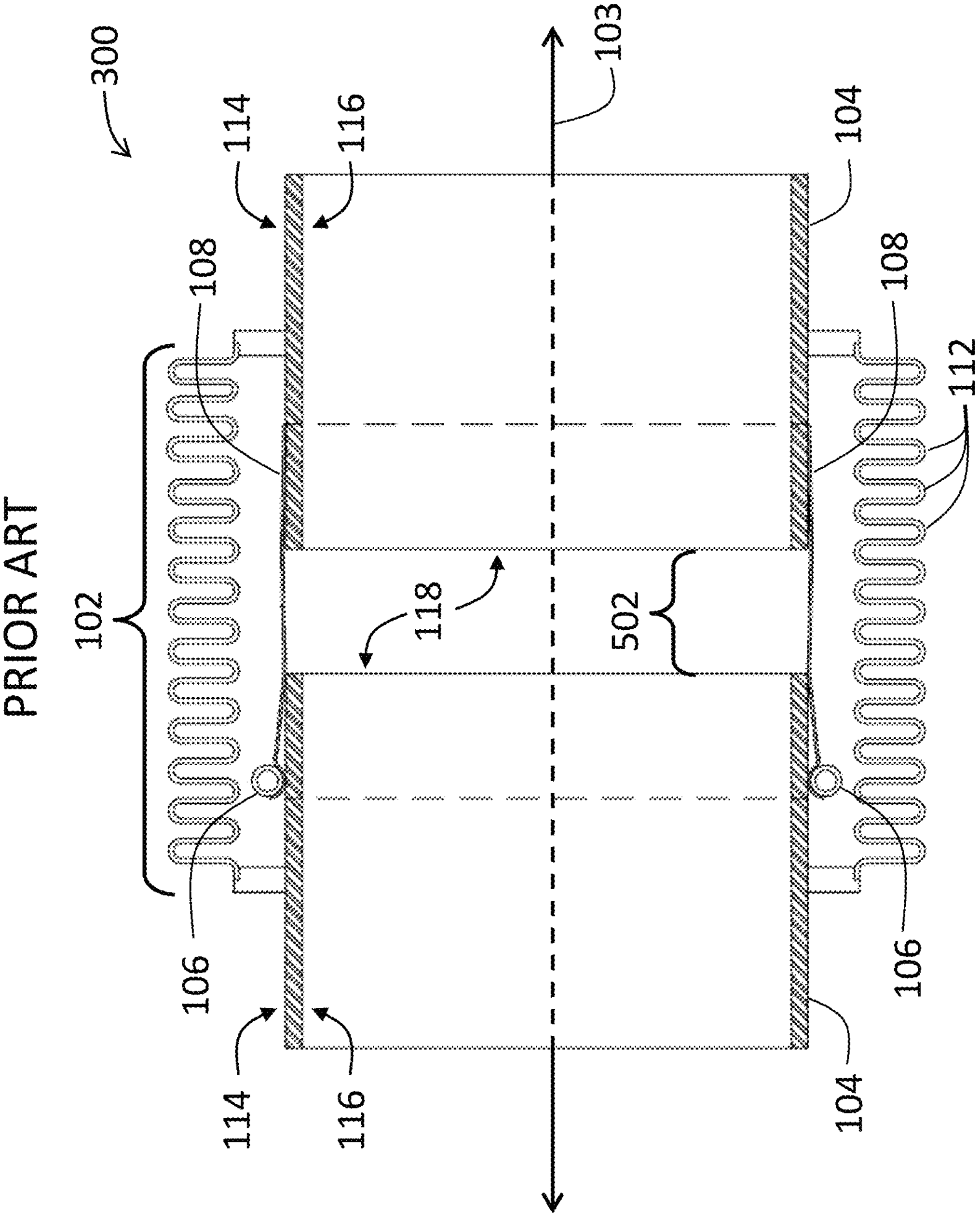
FIG. 5 is a cutaway side view of the high-vacuum beam line assembly of FIG. 3 as taken through line A-A of FIG. 3 and illustrating an operation-ready position.

Referring now to FIGS. 4 and 5, and still referring to FIGS. 1-3, each beam tube 104 in the beam line assembly 300 may include both an outer surface 114 and an inner surface 116. The mating ends 101 of the bellows assembly 100 may sized and shaped to fittedly receive the outer surface 114 of a respective one of the pair of abutted beam tubes 104. The RF shield comprises a plurality of RF shield fingers 108, each of which may be sized and shaped to be received and held in place by a spring 106. The RF shield fingers 108 may be pressed by the spring 106 into contact with an outer surface 114 of a first of the two abutted beam tubes 104. More specifically, on this beam tube 104, the RF shield fingers 108 may be held in place by the spring 106 exerting a radially inward (with respect to the nominal axis 103) force on the finger 108. On the opposite beam tube 104, the RF shield finger 108 may be affixed (e.g., welded) either to a fixed rim of the mating end 101 of the bellows assembly 100 or, alternatively, to an outer surface 114 of the received beam tube 104 itself. In such a configuration, the RF shield fingers 108 may span the axial gap 502 of the abutted ends 118 of the beam tubes 104 on the respective outside surface 114 of each of the beam tubes 104.

Figure 6A:
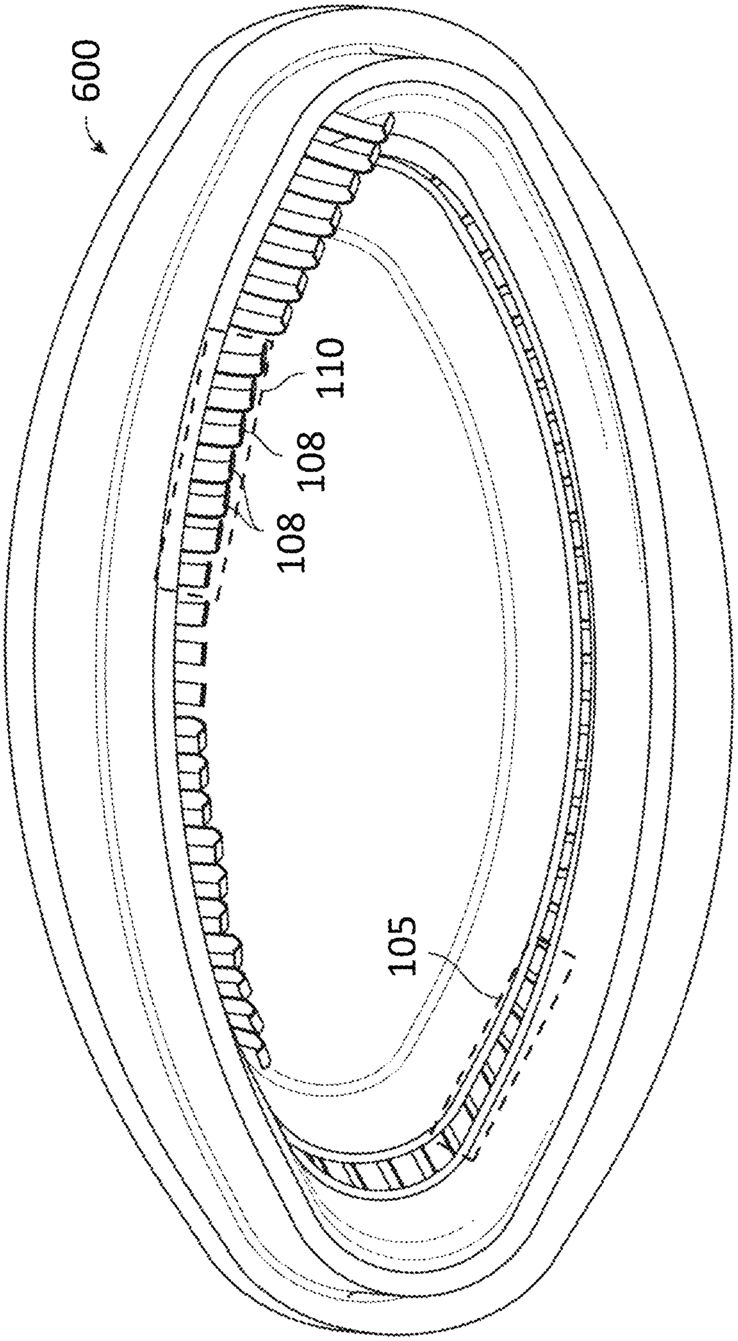
FIG. 6A is a top perspective view of a radio frequency (RF) shield illustrating both a repair portion and an operation-ready position as known in the prior art.
Figure 6B:
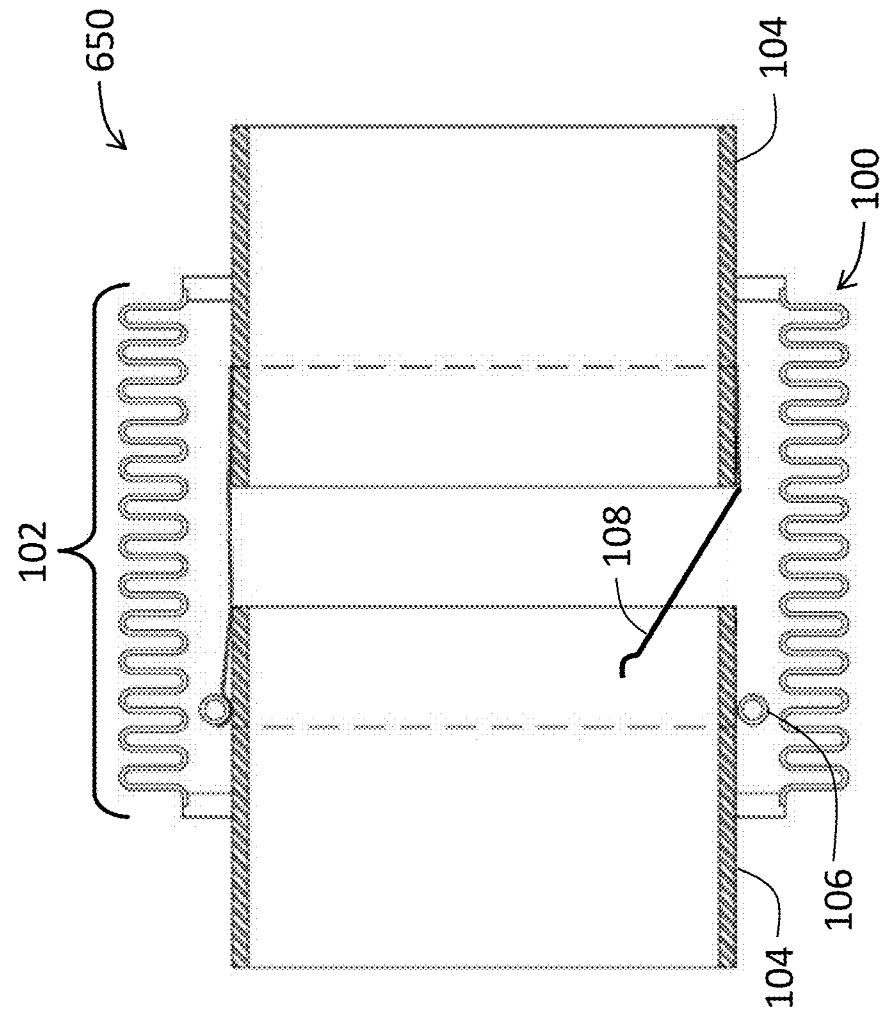
FIG. 6B is a cutaway side view of the high-vacuum beam line assembly of FIG. 1 as taken through line A-A of FIG. 3 and illustrating the repair portion and the operation-ready position of FIG. 6A.

Referring now to FIG. 6, and still referring to FIGS. 1-5, a known disadvantage of RF shield design is that the RF shield fingers 108 may, under high stress conditions of use of a supported beam line assembly 300, dislocate from under their respective receiving springs 106 and snap out of proper (e.g., operation-ready) position 105. In such a failure event, the dislocated fingers 108 (shown as repair portion 110) may bend inward into a beam line assembly 300 flexibly attached by that damaged RF shield). As illustrated in the alternative failure event view 650 of FIG. 6B, the spring 106 side of some number of the RF shield fingers 108 may dislocate and project radially inward (i.e., with respect to the nominal axis 103 of the abutted beam tubes 104) into the beam line assembly 300.

Figure 7:
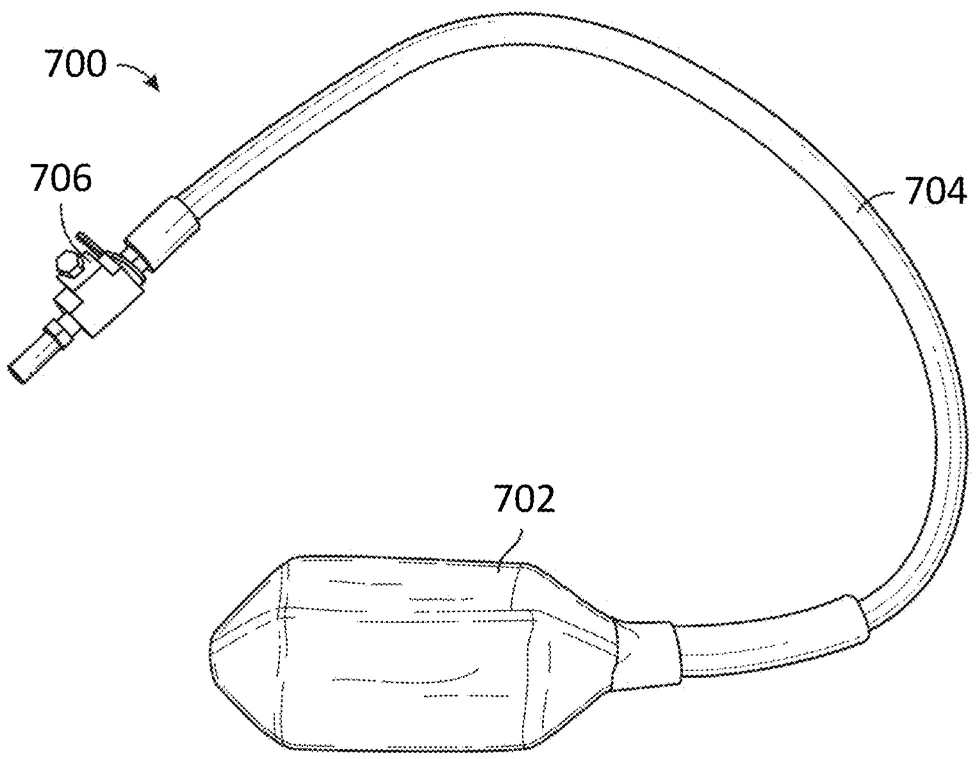
FIG. 7 is a top perspective view of an inflatable pipe plug according to an embodiment of the present invention.

Referring now to FIG. 7, an inflatable pipe plug 700 that may be used to manipulate dislocated RF shield fingers 108 back into operation-ready position 105 according to an embodiment of the present invention will now be described in detail. For example, and without limitation, the inflatable pipe plug 700 may comprise a balloon 702, a delivery hose 704, and a connector 706. The balloon 702 may be made of a nitrile material which advantageously may be cleaned of radioactive contamination that may be present in the beam line assembly 300 that is the subject of RF shield repair. Additionally, a nitrile balloon 702 advantageously may be cleaned prior to use to ensure this tool is free of contaminants (e.g., particulates) before introduction into the beam line assembly 300 requiring repair.

Figure 8:
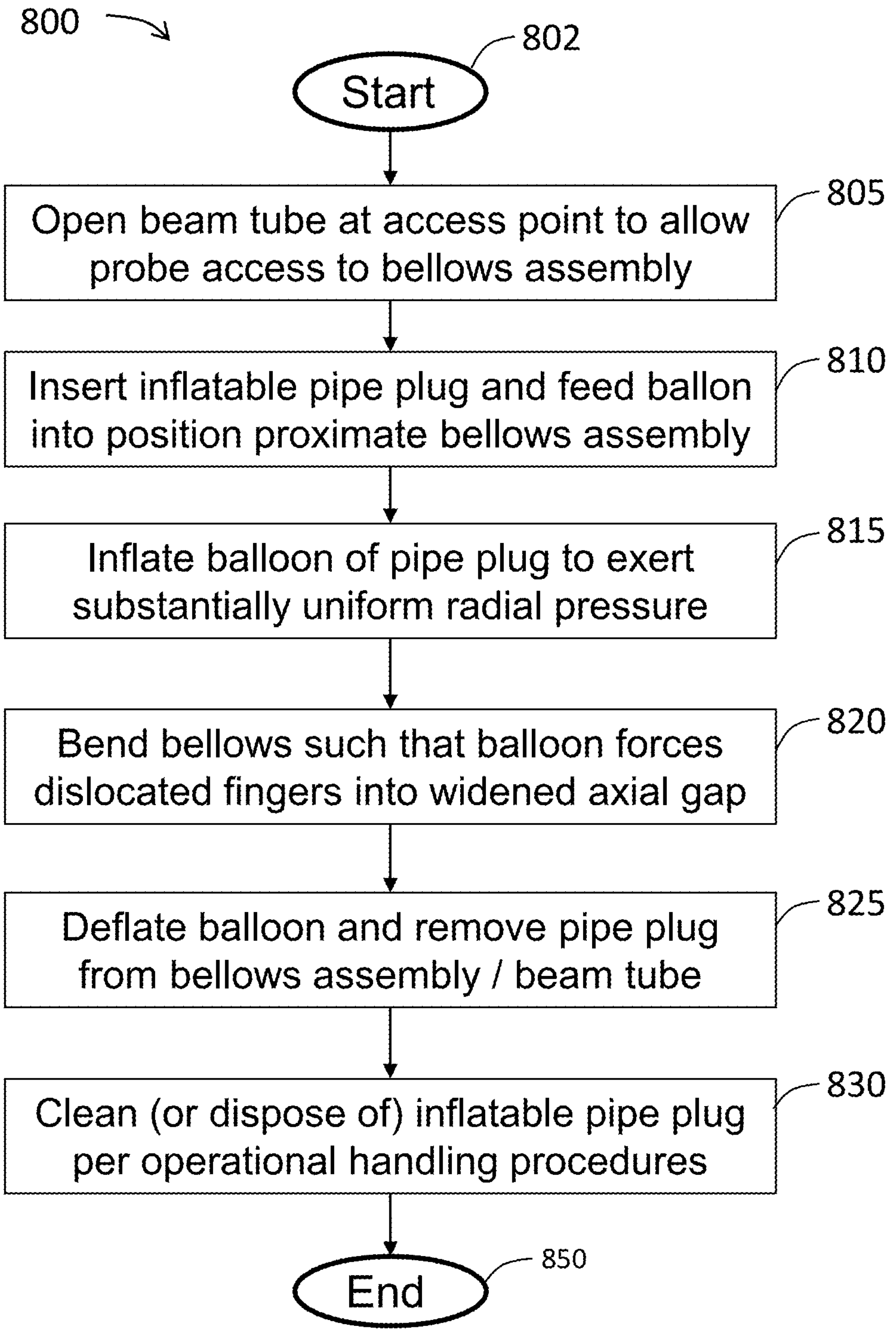
FIG. 8 is a flowchart of a method of operating an inflatable pipe plug to repair dislocated RF shield fingers of a high-vacuum beam line assembly according to an embodiment of the present invention.
Figure 9:
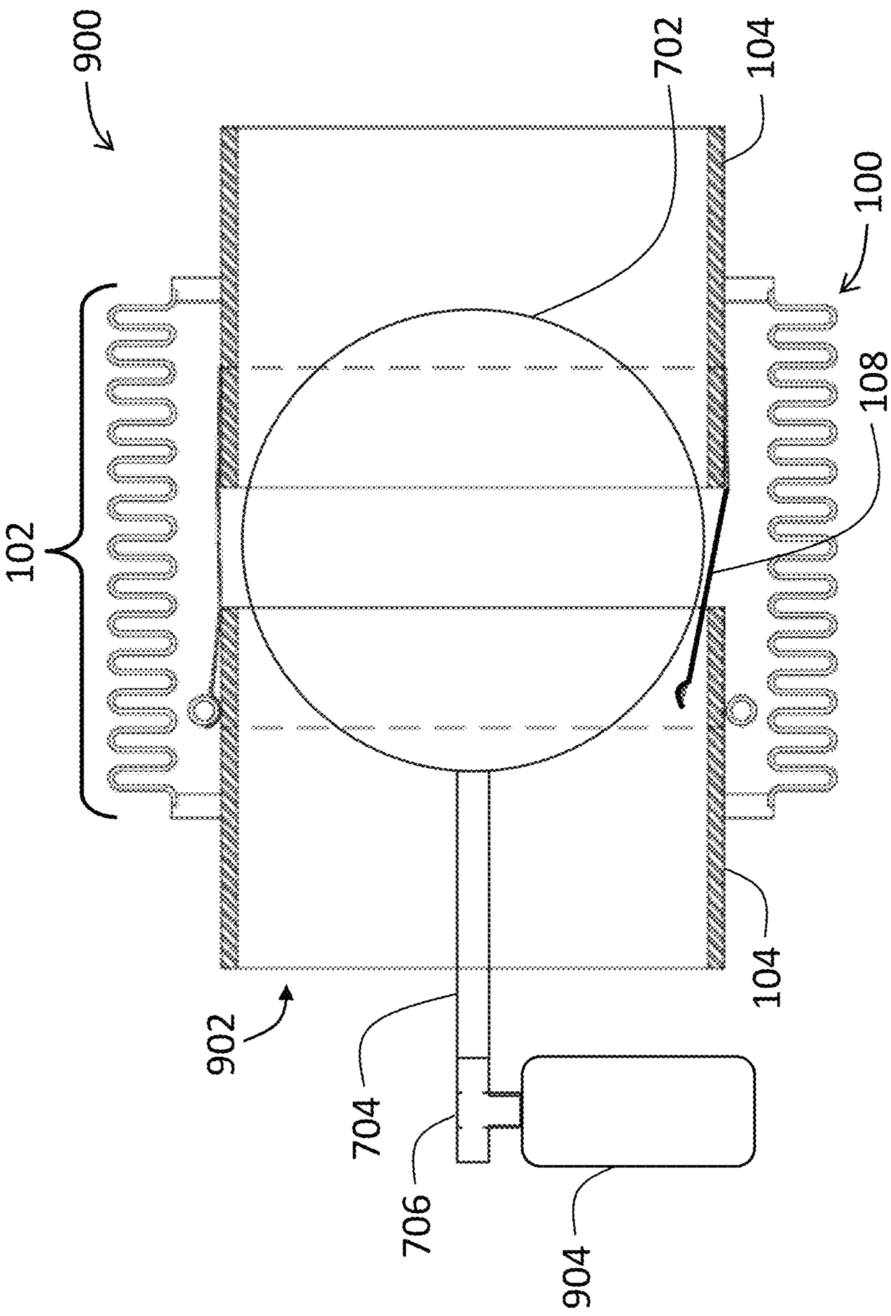
FIG. 9 is a schematic view of the method steps of inserting and positioning the inflatable pipe plug of FIG. 7 at the repair portion of the high-vacuum beam line assembly of FIG. 6B according to an embodiment of the present invention.
Figure 10:
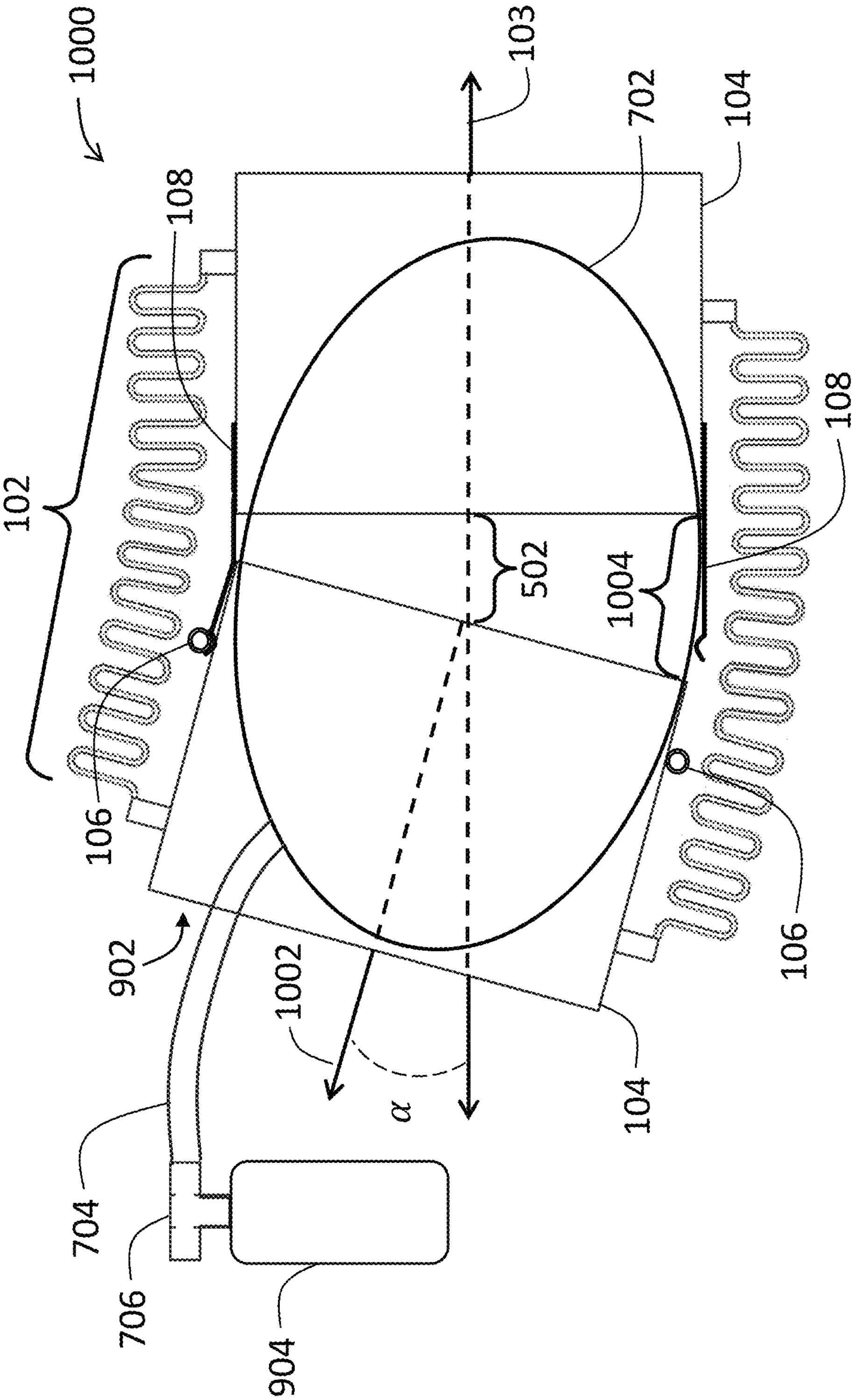
FIG. 10 is a schematic view of the method steps of inflating the inflatable pipe plug of FIG. 7 and bending the bellows assembly of the high-vacuum beam line assembly to press dislocated RF shield fingers of FIG. 6B through an enlarged axial gap according to an embodiment of the present invention.

Referring now to FIGS. 8, 9, and 10, and still referring to FIGS. 1-7, a method 800 of using the inflatable pipe plug 700 of FIG. 7 to repair an RF shield of a beam line assembly 300, according to an embodiment of the present invention, will now be described in detail. From the start at Block 802, a first step in repairing dislocated RF shield fingers 108 may be to open the beam line assembly 300 at an access point 902 to allow probe access to the bellows assembly 100 (Block 805). The balloon 702 then may be fed, with the delivery hose 704 in tow and the connector 706 still accessible outside the beam line assembly 300, into position proximate the RF shield of the bellows assembly 100 (Block 810). As illustrated in FIG. 9, the balloon 702 inserted into the bellows assembly 100 through the beam line assembly 300 access point 902 may subsequently be inflated to a substantially uniform radial pressure about the interior of the bellows assembly 100 and two received beam tubes 104

(Block 815). The connector 706 may be connected to a fluid delivery mechanism 904 (e.g., an air compressor) which may supply the fluid (e.g., air) necessary to inflate the balloon 702 to a desired pressure. At Block 820, with the inflated balloon 702 applying uniform pressure upon a repair portion 110 comprising dislocated RF shield fingers 108, the bellows assembly 100 may be bent such that the uniform pressure forces dislocated RF shield fingers 108 into the enlarged axial gap 1004 resulting from the bend action, thereby allowing the RF shield fingers 108 to move back into proper position. Referring more specifically to schematic 1000 of FIG. 10, after inflating the balloon 702 to the desired pressure, bending the bellows assembly 100 at an angle 1002 with respect to the nominal axis 103 to create a larger axial gap 1004 proximate the repair portion 110 may create more space for the dislocated RF shield fingers 108 in the repair portion 110 to move back into proper (i.e., operation-ready) position 105. Upon moving the target RF shield fingers 108 radially outward through the enlarged axial gap 1004, the bend angle 1002 may returned to a position coaxial with the nominal axis 103 of the abutted beam tubes 104 and the respective free end of each previously dislocated finger 108 may tuck back under the pressure of a receiving spring 106. A person of skill in the art will immediately recognize the bend angle 1002 may vary depending on the size and design of the bellows assembly 100 being repaired. For example, and without limitation, the bellows 102 may be bent at a 150 angle 1002.

Continuing to refer to FIG. 8, upon repair of dislocated RF shield fingers 108 of interest, the balloon 702 may be deflated and removed with the delivery hose 704 from the beam line assembly 300 through the access point 902 (Block 825). The used balloon 702 and/or delivery hose 704 may then be either cleaned or disposed of per operational handling procedures (Block 830). This method 800 of correcting dislocated RF shield fingers 108 in a repair portion 110 of a beam line assembly 300 advantageously may reduce time spent by particle accelerator maintenance technicians in radiation contaminated environments, and also may reduce the need for costly full replacement of bellows assemblies 100 and/or operation-ready RF shields 105.

Figure 11:
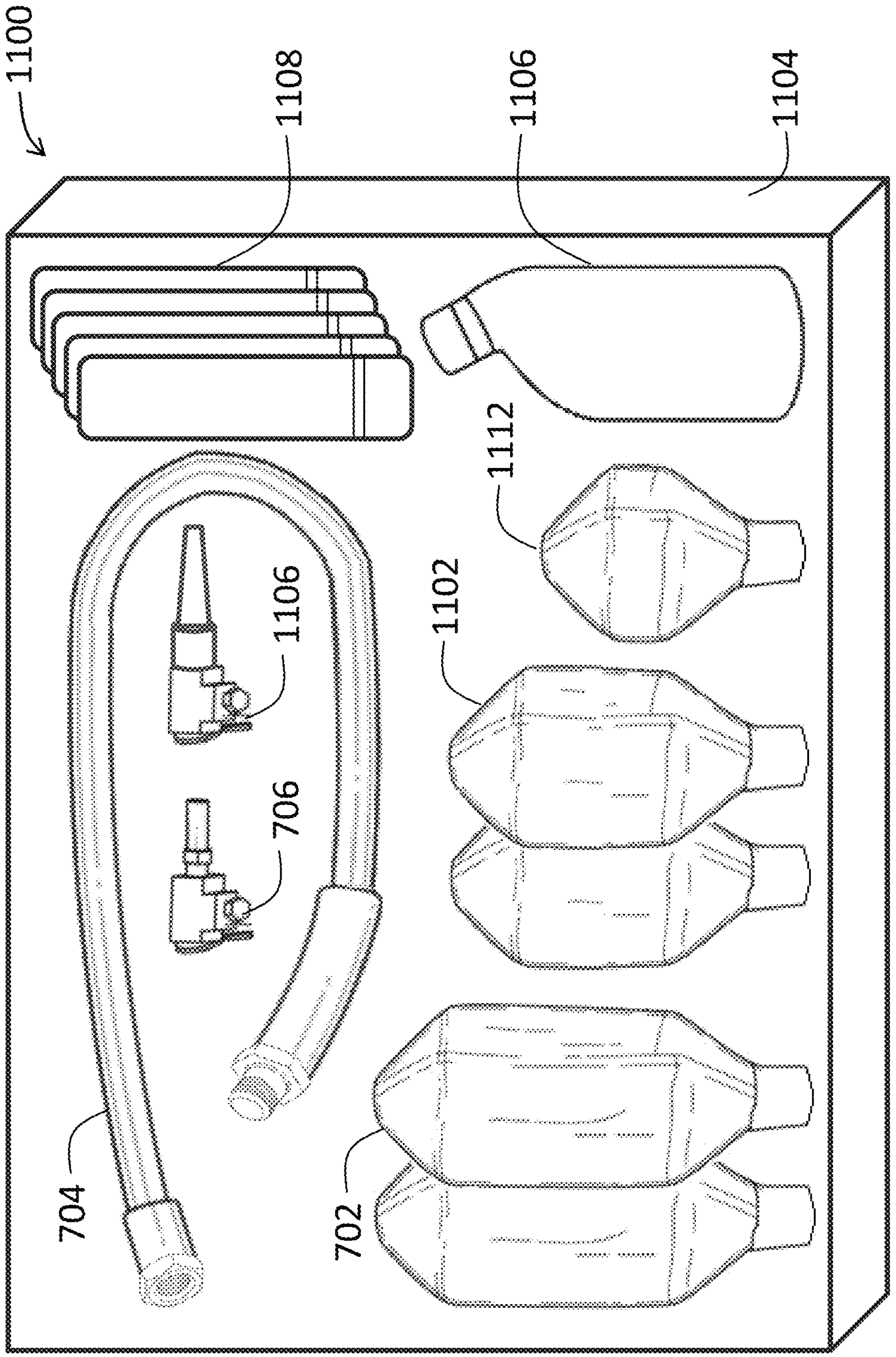
FIG. 11 is a top perspective view of a corrector system kit according to an embodiment of the present invention.

Referring now to FIG. 11, and still referring to FIG. 8, the equipment needed for performing the hereinabove method 800 of positioning dislocated RF shield fingers may be advantageously packaged in a ready-to-use and tailorable kit of components. For example, and without limitation, a corrector system kit 1100 may comprise a ready-to-assemble inflatable pipe plug 700 with a balloon of standard size 702, as well as several spare balloons of various sizes 1102, 1112. The standard balloon 702 may be swapped out of the core inflatable pipe plug 700 configuration, on demand, for a spare balloon 1102, 1112 to correspond with the size of a target bellows assembly 100 needing repair. Similarly, the corrector system kit 1100 may comprise a connector of standard size 706, as well as some number of alternative connectors/adapters of various sizes 1106. The standard connector 706 may be swapped out of the core inflatable pipe plug 700 configuration, on demand, for an alternative connector/adaptor 1106 to correspond with the interface fitting type of a fluid delivery mechanism 904 employed. An assembled, core configuration inflatable pipe plug 700 included in the connector kit 1100 may have a delivery hose 704 of standard length. In addition, the kit 1100 may contain a coil of trimmable delivery hose 704, so that the inflatable pipe plug 700 may be modified to reach RF shield locations that are otherwise outside of the reach of the standard delivery hose length 704. The kit 1100 also may contain a decontaminating cleaning agent 1106 that may be used to decontaminate balloons 702, 1102, 1112 before and/or after use. The kit 1100 may also contain some number of radioactive waste disposal bag(s) 1108 large enough, for example, and without limitation, to hold all contents of the entire kit 1100. A bag 1108 may be used when, for whatever operational reason, the balloon 702 or other components of the inflatable pipe plug 700 cannot be adequately decontaminated through cleaning.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

Thus, the scope of the invention should be determined by the appended claims and their legal equivalents, and not by the examples given.

That which is claimed is:

1. A method of repairing a high-vacuum beam line assembly comprising a bellows characterized by a cylindrically-formed plurality of expansion joints configured to flexibly couple a pair of beam tubes abutted in substantially axial alignment, to define a nominal axis, and by a radio frequency (RF) shield comprising at least one spring configured to exert radially inward force on a plurality of fingers distributed azimuthally along a respective outer surface of each of the pair of beam tubes and configured to span an axial gap between a respective abutted end of each of the pair of beam tubes, to define an operation-ready position; the method comprising the steps of:

positioning a balloon of an inflatable pipe plug inside the high-vacuum beam line assembly proximate the axial gap;

inflating the balloon to exert a substantially uniform pressure radially outward from the nominal axis along the plurality of fingers proximate the axial gap;

angularly bending the bellows along a subset of the plurality of expansion joints to enlarge a repair portion of the axial gap to a width larger than a length of a dislocated finger of the plurality of fingers positioned proximate the repair portion and radially inward of an inner surface of at least one of the pair of beam tubes; and upon the substantially uniform pressure from the balloon positioning the dislocated finger with the plurality of fingers collectively in the operation-ready position, angularly bending the bellows along the subset of the plurality of expansion joints to position the pair of beam tubes back in substantially axial alignment with the nominal axis.

2. The method of repairing the high-vacuum beam line assembly according to claim 1, wherein the inflatable pipe plug further comprises a delivery hose configured in fluid communication with the balloon on a first end and a connector on a second end; and wherein the method further comprises extending the delivery hose from the balloon axially along an inside of one of the pair of beam tubes, to define a working beam tube, to position the connector proximate an access point in the working beam tube.

3. The method of repairing the high-vacuum beam line assembly according to claim 1, wherein the substantially uniform pressure is approximately 10 pounds per square inch (psi).

4. The method of repairing the high-vacuum beam line assembly according to claim 1, wherein the inflating the balloon further comprises pumping air, using an air compressor configured in fluid communication with the connector, through the delivery hose and into the balloon.

5. The method of repairing the high-vacuum beam line assembly according to claim 1, wherein the angularly bending the bellows further comprises manipulating the plurality of expansion joints along the bellows at an approximate 15 degree angle from the nominal axis of the high-vacuum beam line assembly.

6. The method of repairing the high-vacuum beam line assembly according to claim 1, wherein the balloon is of a nitrile material type.

7. The method of repairing the high-vacuum beam line assembly according to claim 2, further comprising deflating the balloon to reduce axially outward pressure along the plurality of fingers proximate the axial gap; and removing the inflatable pipe plug from inside the high-vacuum beam line assembly by way of the access point.

8. A corrector system for repairing a high-vacuum beam line assembly comprising a bellows characterized by a cylindrically-formed plurality of expansion joints configured to flexibly couple a pair of beam tubes abutted in substantially axial alignment, to define a nominal axis, and by a radio frequency (RF) shield comprising at least one spring configured to exert radially inward force on a plurality of fingers distributed azimuthally along a respective outer surface of each of the pair of beam tubes and configured to span an axial gap between a respective abutted end of each of the pair of beam tubes, to define an operation-ready position; the corrector system comprising:

a balloon of an inflatable pipe plug configured for positioning inside the high-vacuum beam line assembly proximate the axial gap, and inflating to exert a substantially uniform pressure radially outward from the nominal axis along the plurality of fingers proximate a repair portion of the axial gap enlarged, by angularly bending the bellows along a subset of the plurality of expansion joints, to a width larger than a length of a dislocated finger of the plurality of fingers positioned proximate the repair portion and radially inward of an inner surface of at least one of the pair of beam tubes.

9. The corrector system according to claim 8, wherein the inflatable pipe plug further comprises a delivery hose configured in fluid communication with the balloon on a first end and a connector on a second end; wherein the delivery hose is configured to extend the balloon axially along an inside of one of the pair of beam tubes, to define a working beam tube, and to position the connector proximate an access point in the working beam tube.

10. The connector system according to claim 8, wherein the substantially uniform pressure is approximately 10 pounds per square inch (psi).

11. The connector system according to claim 8, an air compressor configured to attach in fluid communication with the connector and to pump air through the delivery hose and into the balloon.

12. The connector system according to claim 8, wherein the angularly bending the bellows further comprises manipulating the plurality of expansion joints along the bellows at an approximate 15 degree angle from the nominal axis of the high-vacuum beam line assembly.

13. The connector system according to claim 8, wherein the balloon is of a nitrile material type.

14. The connector system according to claim 9, wherein the balloon is further configured for deflating to reduce axially outward pressure along the fingers proximate the axial gap; and wherein the inflatable pipe plug is further configured for removing from inside the high-vacuum beam line assembly by way of the access point.

15. A corrector system kit for repairing a high-vacuum beam line assembly comprising a bellows characterized by a cylindrically-formed plurality of expansion joints configured to flexibly couple a pair of beam tubes abutted in substantially axial alignment, to define a nominal axis, and by a radio frequency (RF) shield comprising at least one spring configured to exert radially inward force on a plurality of fingers distributed azimuthally along a respective outer surface of each of the pair of beam tubes and configured to span an axial gap between a respective abutted end of each of the pair of beam tubes, to define an operation-ready position; the corrector system kit comprising:

a plurality of ballons, wherein one of the plurality of balloons, defined as a custom-sized balloon, is configured for positioning inside the high-vacuum beam line assembly proximate the axial gap, and inflating to exert a substantially uniform pressure radially outward from the nominal axis along the plurality of fingers proximate a repair portion of the axial gap enlarged, by angularly bending the bellows along a subset of the plurality of expansion joints, to a width larger than a length of a dislocated finger of the plurality of fingers positioned proximate the repair portion and radially inward of an inner surface of at least one of the pair of beam tubes.

16. The corrector system kit according to claim 15, further comprising a delivery hose configured to removably attach in fluid communication with each of the plurality of ballons on a first end and a connector on a second end; wherein the delivery hose is configured to extend the custom-sized balloon axially along an inside of one of the pair of beam tubes, to define a working beam tube, and to position the connector proximate an access point in the working beam tube.

17. The connector system kit according to claim 16, wherein the delivery hose is trimmable to a length defined substantially from the access point to the axial gap.

18. The connector system kit according to claim 16, further comprising a manual hand pump configured to attach in fluid communication with the connector and to pump air through the delivery hose and into the custom-sized balloon.

19. The connector system kit according to claim 15, wherein each of the plurality of balloons is of a nitrile material type.

20. The connector system kit according to claim 15, further comprising at least one of a decontaminating cleaning agent and a radioactive waste disposal bag.

* * * * *